United States Patent Office 2,844,542
Patented July 22, 1958

2,844,542

COPRECIPITATED HYDROFORMING CATALYSTS

John A. Hinlicky, Irvington, and George E. Serniuk, Roselle, N. J., assignors to Esso Research and Engineering Company, a corporation of Delaware No Drawing. Application January 2, 1953
Serial No. 329,452

4 Claims. (Cl. 252—466)

This invention relates to the preparation of catalysts for the treatment and conversion of hydrocarbons. More specifically, it relates to a new and improved method of preparation of a catalyst containing small amounts of a metal catalyst supported on a thermally stable coprecipitated form of active alumina.

The catalytic metals with which this invention is concerned are the noble metals of group VIII of the periodic system, which are known to be highly active for the hydrogenation and dehydrogenation of hydrocarbons. These catalysts also have a pronounced effect on splitting and rearranging the carbon-hydrogen and carbon-carbon bonds of hydrocarbon molecules at elevated temperatures. The specific noble metals with which the invention is particularly concerned include platinum, palladium, rhodium, iridium and the like.

These noble metal catalysts can be employed to particular advantage on a catalyst support in which alumina is the major constituent, and the catalytic metal is present in very small amounts or even trace amounts. Thus, a variety of catalysts containing fractional percentages of platinum or palladium on an alumina-containing carrier have been found to be applicable to hydrocarbon conversion processes. They may be used to convert naphtha fractions of low motor fuel value to premium quality products having a high aromatic content, and improved volatility. Not only are high quality products obtained; an important advantage of these catalysts is that the particular combination of reactions which they promote with a naphtha feed stock is such that the original low octane quality feed constituents may be almost completely removed by a combination of isomerization, dehydrogenation and cyclization reactions.

These catalysts have been particularly useful in reactions of the general type known as hydroforming. This is an operation carried out in the presence of a solid catalyst and in an atmosphere containing free hydrogen, but without a net consumption of hydrogen. In hydroforming operations, there is ordinarily a net evolution of hydrogen due to the transformation of other hydrocarbons into aromatics. The group of hydrocarbons or aromatic precursors thus transformed includes substantially all of the $C_6$ ring naphthenes, a varying proportion of the $C_5$ ring naphthenes, and a significant or major proportion of the original paraffins which varies both with operating conditions and with the content of $C_6+$ hydrocarbon chains in the paraffin molecules present.

The platinum catalysts on an alumina base have been found to suffer from several well-known disadvantages. In the hydroforming of virgin naphtha feed stocks, for example, it is desirable to use these catalysts under relatively severe conditions of the order of 50 to 400 p. s. i. g. since this results in a product of exceptionally high aromatic content and motor fuel quality. Unfortunately, the reactions which take place under these conditions, at relatively low hydrogen partial pressure, also tend to result in the formation of an appreciable carbonaceous deposit which rapidly deactivates the catalyst. For this reason it has been common practice in commercial hydroforming operations with Pt-alumina catalysts to avoid the use of such low operating pressures, in spite of the high product quality which can be obtained by their use.

A particularly serious disadvantage of the supported noble metal catalysts, of which platinum on alumina may be taken as typical, is the fact that a coked catalyst of this type cannot ordinarily be regenerated readily with air over long periods of time without a definite loss in activity. This activity loss is so severe in many cases that it becomes completely impossible to produce a product of more than mediocre quality.

It is true that at higher operating pressures of the order of 400 to 1,000 p. s. i. g., the same catalysts may give a non-regenerative process in which the catalyst retains its activity over long periods of time without deactivation. However, the use of such high hydrogen pressures tends to increase the breakdown of the original molecular structure to lower molecular weight saturated materials, by a combination of various cracking, dealkylation, and rehydrogenation reactions known collectively as hydrocracking. Hydrocracking under these high pressure hydroforming conditions can be minimized, but only to a limited extent, by variations in the composition of the catalyst.

The development of platinum catalysts suitable for air regeneration is thus an important problem, and the lack of such catalysts has been a serious obstacle in the way of low pressure platinum catalyst reforming.

A careful study of the characteristics of highly active and deactivated catalysts of this general type has indicated that the structure of the platinum has a definite relationship to activity. Apparently, the ability of these catalysts to stand repeated regeneration as required for low pressure hydroforming operations can be correlated to a considerable extent with the fineness or crystallite size of the platinum dispersion.

Catalysts of low initial activity, and catalysts whose activity has become spent upon repeated regeneration, are both found to have the platinum in the form of relatively large crystals. For a given platinum content, this may mean that there are fewer active platinum centers exposed, less platinum surface exposed for catalytic action, possibly less intimate contact between the platinum and the catalyst support, and correspondingly more catalyst surface where the base is relatively remote from a platinum center of activity.

With the usual platinum-on-alumina base catalyst, therefore, the necessity of operating at minimum carbon levels places a limit on either the operating severity and product quality or on catalyst life, since operating at a severity sufficient to give high octane quality results in high coke formation and an increased rate of catalyst deactivation. Various methods have been proposed to minimize this tendency, including changes in the method of platinum impregnation and activation of the platinum-on-alumina catalyst. Experience has shown, however, that the high initial activity which can be realized by having a very fine initial degree of metal dispersion is not at all necessarily linked with high stability. High stability toward repeated air regeneration does appear to be linked with high thermal stability, and this is a property determined by the character of the alumina base itself as well as by the type and fineness of the platinum dispersion.

The ability of a given platinum-alumina catalyst to withstand prolonged exposure to air at elevated temperature is found to be related directly to the rate or extent to which platinum crystallite size increases on heat aging. Without limiting the present invention to any theories of operation, it is apparent that a good platinum or other noble metal catalyst for use under high severity conditions where air regeneration is required must combine a good initial activity with high thermal stability.

An object of the present invention is to prepare a noble metal catalyst for the hydroforming of naphthas suitable for use under coking conditions, where air regeneration is required, to obtain a product of improved octane quality.

Another object is to prepare a noble metal catalyst of improved regeneration characteristics.

Still another object is to prepare such a catalyst in which the noble metal is stabilized for repeated regenerations by being finely dispersed throughout an alumina base of greatly improved thermal stability.

Another object is to prepare such a catalyst by a specific process in which the alumina carrier base is brought down from a true solution of an aluminum alcoholate in an alcoholic solution containing also a platinum compound in homogeneous dispersion, which is coprecipitated with the alumina by the addition of ammonium hydroxide and subsequently converted to metallic platinum.

According to the present invention, catalysts of good activity and selectivity and markedly superior stability to air regeneration may be obtained by simultaneously gelling the alumina and co-precipitating a platinum compound from an alcoholic solution by the addition of controlled amounts of concentrated ammonia. The platinum compound in this method of preparation is homogeneously dispersed in the original solution, and included in the final catalyst in the finest state of dispersion. The ability of the catalysts thus prepared to maintain a very fine state of Pt dispersion even after exposure to high temperature oxidation conditions is directly related to the stability of these catalysts toward air regeneration. The initial dispersion obtained by including a platinum compound into the hydrous alumina precipitated in this form of operation is fixed in active and finely dispersed form. This degree of dispersion is retained upon reducing the platinum compound to metallic form, and upon activation and development of the fine alumina structure by calcination of the initial platinum-containing alumina gel.

Catalysts prepared according to this invention may be made by dissolving chloroplatinic acid or other suitable platinum salt in an alcohol or in a small amount of water, combining this with a solution of an aluminum alcoholate in a suitable alcohol which may have added hydrocarbon as a diluent, and slowly adding concentrated ammonium hydroxide to the vigorously stirred solution, held at any desired temperature.

The ammonia under these conditions has a separate precipitating action on both the alumina and the platinum compound deposited from the solution. Thus, ammonia added separately to aqueous solutions of an aluminum salt or a very dilute platinum salt will cause the precipitation of hydrous alumina in the one case but no precipitate of platinum in the other. When the two solutions are mixed or combined before precipitation the precipitating alumina may more or less completely remove the platinum from solution, but this is a secondary effect and not the result of a direct precipitating action of the ammonia on the platinum. In dilute alcoholic solution, on the other hand, the addition of the ammonia will cause a precipitate to form from the platinum solution alone, and this effect shows in the improved character of the coprecipitated catalysts formed from alcoholic solution.

The usual form in which platinum is employed in the preparation of platinum-containing compositions is chloroplatinic acid, available commercially as the hydrated salt $H_2PtCl_6 \cdot XH_2O$ (40% Pt metal), although other Pt salts may be employed. The salt may be dehydrated, but either the anhydrous form or the ordinary hexahydrate is soluble in the alcohol or very soluble in water. The amount of water which is present when a concentrated aqueous solution is employed at this stage represents only about 2% $H_2O$ based on alumina when a 5% Pt-on-alumina catalyst is being prepared, or correspondingly less with lower Pt concentration. This amount of water has relatively little effect, since it is not enough to cause any precipitation of alumina from the alcoholate solution. The concentration of aluminum alcoholate in the organic solution employed in making up these catalysts is commonly of the order of 100 grams of alumina equivalent per liter of solution, and dilute solutions are preferred to give a relatively slow rate of precipitation. For this reason it may be preferable to use the platinum salt in alcoholic solution, to add further diluent alcohol, even though with a concentrated aqueous Pt solution the amounts of water concerned are fractional percentages based on the total solution. It is also possible to dissolve the chloroplatinic acid directly in the alcoholic solution of the aluminum alcoholate used as the source of alumina.

The method of the present invention is particularly suited for the preparation of catalysts containing small amounts of platinum, of the order of from about 0.05 to 2% by weight of metallic platinum in the finished catalyst. While catalysts of the lowest platinum concentration have very desirable activity-selectivity relationships, catalyst activity is improved markedly with increasing platinum concentrations up to about 0.3% platinum. A continued improvement in activity with no loss in selectivity is observed up to about 2% Pt concentration, but the gain above 1% platinum is not as great. Accordingly, concentrations in the range of about 0.3% to 1% Pt in the finished catalyst are preferred.

The particular alcohol or mixture of alcohols used in the preparation of these catalysts depends largely upon the preparation of the alcoholate and the recovery of the alcohol after hydrolysis for reuse in the system. The alcoholate solution used is ordinarily a solution of mixed amylates or aluminum butylates in the corresponding mixed amyl alcohols or butyl alcohols. Lower or higher alcohols may be used in this preparation if desired. Thus, a very good catalyst may be prepared from aluminum isopropoxide in isopropanol, even though the isopropanol released on hydrolysis is water soluble, which makes its ultimate recovery from the solvent vapor stream or liquid layer more difficult. This recovery may be simplified by the addition of a hydrocarbon diluent to the alcohol solution, and a 1:1 dilution of mixed amyl alcohols with a virgin heavy naphtha is the solvent ordinarily used. Still higher boiling alcohols may also be used to advantage, providing the aluminum alcoholate produced is completely soluble in the alcohol used so that a homogeneous solution with the platinum salt can be prepared prior to the hydrolysis and precipitation of the hydrous alumina. This solubility is enhanced by the use of mixed alcohols and such a mixed solvent is preferred, regardless of whether the particular alcohols used are mixed butanols, pentanols, or their higher molecular weight homologues.

It should be recognized that the character of the hydrous alumina formed by the hydrolysis of the alcoholate solution in the presence of the platinum salt and ammonia is not necessarily the same as that which is formed from the alcoholate alone under the same conditions of hydrolysis. The presence of the platinum salt in the mixed alcoholic solution prior to the hydrolysis is an essential feature of the present invention, which relates to the whole method of preparing the catalyst as distinguished from the preparation of the alumina base itself.

After the platinum-containing gel is formed at room temperature, the material is dried thoroughly at a relatively low temperature, in the range of 100° to 300° F. to remove remaining traces of the organic solvent before the platinum is reduced to the metallic form. This solvent evaporation may be expedited by using a stream of a stripping gas such as steam. Following this low temperature drying, the catalyst may be dried further at gradually increasing temperature levels or in successive stages at about 500° to 1100° F. in the usual manner, and reduced with hydrogen before use. This drying step following complete solvent removal may also be carried out in a hydrogen atmosphere.

The present method of preparation combines a fine platinum dispersion with a type of alumina which produces a catalyst exhibiting unusually high thermal stability. The desired high thermal stability depends in turn both upon the type of alumina produced and upon the method by which the platinum is combined with it. Essential features are the precipitation with ammonia from an alcoholic solution in which the platinum is included before the alcoholate is hydrolyzed.

The platinum to be added in this method of preparation may be combined with a solubilizing and peptizing agent such as glacial acetic acid, or other organic acid, which serves both as an aid in obtaining uniform dispersion of platinum in the alumina and to prepare a carrier base of improved surface properties.

Catalysts of the desired Pt concentration can be prepared by including the requisite amounts of platinum salt in the whole amount of the alcoholate solution required to give a finished catalyst having the desired concentration of catalytic metal. It is also possible, however, to prepare active catalysts of the same platinum concentration by an intermediate concentrate technique in which a small amount of a platinum-alumina composition of higher metal concentration is mixed with or precipitated on the surface of a larger amount of alumina carrier base. The alumina carrier in this type of procedure may be separately prepared. A 0.5% Pt-on-alumina catalyst can be made up according to this procedure, for example, by mixing ten parts of a platinum concentrate comprising 5% Pt-on-alumina with 90 parts of a suitable alumina base. This procedure has been described in more detail in a co-pending application S. N. 263,694, now abandoned, by Thorn and Guyer entitled "Platinum Hydroforming Catalysts." Among other advantages, this particular modification permits the use of much smaller volumes of solution in the preparation of the platinum-alumina composite, since the major portion of the alumina in the final catalyst is separately prepared. This major or "diluent" portion of the alumina may be, for example, one of the commercially available varieties of pure or promoted activated alumina.

Several examples of the preparation and use of 5% Pt on alumina catalyst composites according to this procedure and alternate methods will now be given to illustrate applicants' invention.

EXAMPLE I

Two similar catalyst composites having a nominal 5% Pt on alumina, hereinafter referred to as catalyst A and catalyst B, are prepared by precipitation from aluminum isopropoxide and chloroplatinic acid in dilute isopropanol solution. For each of these preparations 100 grams of the alcoholate, equivalent to 25 grams of alumina, is slurried in one liter of the alcohol, heated on a steam bath and cooled. A second solution containing 3.13 grams of $H_2PtCl_6$ in 500 cc. of isopropanol, equivalent to 1.25 grams of Pt, is then mixed with the cooled alcoholate solution.

For catalyst A, the mixed alcoholic solution thus prepared is allowed to hydrolyze slowly over a period of 24 hours by exposure to moist air. The gelatinous coprecipitate obtained is filtered, stripped on a steam bath, and oven-dried at 250° F.

Catalyst B is prepared, according to the present invention, by hydrolyzing the mixed alcoholic solution with 115 cc. of concentrated ammonium hydroxide. The ammonia is added slowly with vigorous stirring, over a period of ten to twenty minutes, and allowed to stand from several hours to overnight to ensure complete reaction. The homogeneous gelatinous precipitate obtained is filtered, washed with pure water, dried on the steam bath and then overnight at 250° F.

The dried composite is then ground and pilled, with the addition of diluent alumina if desired, and the platinum present is reduced to the free metallic form by raising its temperature gradually in an atmosphere of hydrogen and holding at 900° F. for at least one hour to give the finished catalyst.

EXAMPLE II

A similar pair of related catalysts C and D is prepared by precipitation from mixed aluminum amylates and chloroplatinic acid in an amyl alcohol-hydrocarbon solution. The solution for these preparations consists of 146 cc. containing 60 grams of mixed aluminum amylates, equivalent to 10 grams of alumina, in a 50/50 solvent blend of mixed amyl alcohols and a heavy naphtha fraction, to which is added 1.25 grams of chloroplatinic acid dissolved in 7.6 cc. of glacial acetic acid. This corresponds to 5 wt. percent of Pt and 80% of one mole equivalent of acetic acid based on the alumina.

Catalyst C is prepared by hydrolyzing the mixed solution with 12 cc. of water, added slowly with stirring and standing overnight to ensure complete reaction. Catalyst D is prepared according to the present invention, by hydrolyzing with 40 cc. of ammonium hydroxide. Both preparations are dried and reduced in hydrogen as above to give the finished catalysts for testing.

TESTING III

Evidence of the improved stability of the new catalysts towards high temperature oxidizing conditions is obtained in a convenient accelerated test which measures the change in actual hydroforming activity and the related change in X-ray crystal size of the platinum particles in an aged sample of catalyst, before and after a prolonged exposure to high temperatures in which the catalyst is heated at 1250° F. for 64 hours in air. These tests show that catalyst having the smallest change in platinum crystallite size after heat aging correspond uniformly with those having the highest remaining activity. Platinum crystallite size approaches an equilibrium value during this heat aging period, with relatively little further change on further heating. Pilot plant tests show that this corresponds to the crystallite size which is approached as an equilibrium value in low pressure hydroforming tests involving periodic air regeneration over a much longer period of time, which varies from days to weeks or months depending upon catalyst stability. Fresh catalysts of high activity show a crystallite size of about 30–50 Angstroms on X-ray examination before aging. The extent to which this size increases during the heat aging test is a direct measurement of thermal stability, and high thermal stability is a prime requisite in catalysts which are to be regenerated by burning in air.

The X-ray measurement of platinum concentration and crystallite size is based on a spectrometer trace of the diffraction pattern. The line chosen for the study of these catalysts corresponds to the Miller indices $(h, k, l)$ of (311), representing the reflection from the set of planes in the crystal lattice having the interplanar distance $d=1.18$ A. The lines of lower Miller index are obscured by the pattern of the alumina support. The crystal size is determined from the breadth of the diffraction lines, according to standard procedures, correcting for line broadening. The diffraction patterns used in the present study are obtained with a Norelco Geiger counter X-ray spectrometer.

The effect of the heat aging tests on catalysts A, B, C and D is summarized in the following Table I.

Table I
HEAT AGING STABILITY OF 5% Pt ON ALUMINA CATALYSTS
[Initial Pt crystallite size 30–50 A.]

| Catalyst | Mixed Solution Used | | Method of Hydrolysis | Crystallite Size, A., After Aging |
|---|---|---|---|---|
| | Al Alcoholate | Pt Solution | | |
| A | Isopropoxide | Isopropanol | Moist air | 205 |
| B | ----do---- | ----do---- | Conc. $NH_4OH$ | 135 |
| C | Amylate | Acetic acid | $H_2O$ | 155 |
| D | ----do---- | ----do---- | Conc. $NH_4OH$ | 125 |

The precipitation with concentrated ammonia gives catalysts of superior thermal stability, and this effect appears whether or not the platinum is introduced in glacial acetic acid as a solubilizing and peptizing agent. The results of these tests also show definite advantages for the catalysts of the present invention over catalysts prepared in non-alcoholic solution. Thus, the addition of ammonia to a mixed aqueous solution of aluminum chloride and chloroplatinic acid gives a catalyst (E) which shows a Pt crystallite size of 180 A. after heat aging, indicating only fair thermal stability in spite of good initial activity. Similarly, the impregnation of Pt from aqueous chloroplatinic acid on a pure commercial grade of activated alumina (Alorco F–10) gives a catalyst (F) of 210 A. crystallite size after heat aging and poor thermal stability.

Catalysts B and D of the present invention show 97–99 clear Research octane number for the product naphtha obtained on hydroforming a 200–330° F. Coastal virgin naphtha at 900° F., 2 v./v./hr. space velocity, and a 6/1 hydrogen to hydrocarbon dilution ration. Catalysts C and E show the same very high initial activity while catalysts A and F show an initial product of about 90 octane under the same conditions. Only catalysts B and D in this series, however, show satisfactory thermal stability.

While the above description has been directed primarily to the preparation of Pt catalysts, it will also be recognized that similar techniques may be used to advantage in the preparation of other catalyst on a thermally stable alumina or alumina-containing base. Thus, the technique can also be applied to advantage with metals such as iron, nickel or cobalt, or in general with other catalytic components which can be precipitated from a non-aqueous solvent together with alumina formed by the slow hydrolysis of an aluminum alcoholate in homogeneous solution with the other component desired.

Catalysts prepared according to the present invention may be applied to reforming broad fractions within the naphtha boiling range for the preparation of fuels such as gasoline, or to narrow boiling fractions for the preparation of specific compounds such as benzene or toluene. The naphtha feed stock to be treated by the reforming process can be derived from a wide variety of sources, including straight run or virgin naphtha and various secondary products derived from petroleum or other hydrocarbon feed stocks. It may be understood to include both light naphthas and heavy naphthas within the boiling range from about 0° to 450° F.

Catalysts prepared according to the present invention may be made into the form of powder, microspheres, granules, pellets or larger spherical particles depending upon whether the hydrocarbon treatment for which they are to be employed is carried out by the fluid solids technique or by a moving bed or fixed bed process.

While the above description has directed attention primarily towards the use of these catalysts in hydroforming, they may be also employed to advantage in a variety of hydrocarbon conversion processes involving hydrogen transfer or the presence of molecular hydrogen as a reactant or product gas. This includes catalytic aromatization, hydrofining and hydrocracking, as well as cyclization, hydrogenation, dehydrogenation and hydroforming.

It will also be understood that the exact method described for the precipitation with concentrated ammonium hydroxide is capable of certain useful modifications. Thus, for example, a certain amount or all of the ammonia to be used may be added as anhydrous $NH_3$ to the aluminum alcoholate containing the dissolved platinum salt, to obtain a homogeneous solution from which the hydrous alumina and platinum deposit are subsequently precipitated by the addition of calculated amounts of water. The rate of hydrolysis and precipitation may be controlled by suitable adjustments of the temperature and the rate of water addition. The water to be added, whether as such or in a concentrated or dilute solution of ammonium hydroxide, may be diluted with alcohol if desired. Various methods of finishing the catalysts of the present invention may be employed, including drying, aging of the catalyst precipitate before drying, and reducing the catalytic metal deposit to the free metal form, in a manner well known in the art of preparing noble metal catalysts on an alumina-containing base.

What is claimed is:

1. The method of preparing a platinum-on-alumina catalyst for the treatment and conversion of hydrocarbons which comprises combining in solution of an alcohol having 3 to 5 carbon atoms per molecule a minor amount of a platinum salt and a relatively large amount of an aluminum alcoholate, simultaneously hydrolyzing the aluminum alcoholate and precipitating platinum from said solution by the addition thereto of ammonium hydroxide, drying the deposit thus obtained to obtain a hydrous alumina having a finely divided platinum deposit colloidally dispersed therethrough, reducing this deposit to platinum and recovering a catalyst comprising from about 0.05% to 5% by weight of platinum based on alumina.

2. The method according to claim 1 in which said hydrous alumina-platinum deposit contains in excess of about 2% Pt on alumina, which is then diluted with platinum-free alumina from an extraneous source to give an active catalyst containing from about 0.3% to 1.0% by weight of metallic platinum in the finished catalyst.

3. The method defined by claim 1 in which said recovered catalyst comprises about 0.3% to 1% by weight of platinum based on alumina.

4. The method of preparing a platinum-on-alumina catalyst for the hydroforming of naphthas which comprises dissolving together in dilute solution of an alcohol having 3 to 5 carbon atoms per molecule an aluminum alcoholate and an amount of chloroplatinic acid equivalent to about 0.3% to 1.0% by weight of metallic platinum in the fiinshed catalyst, treating this solution with ammonium hydroxide to obtain a combined precipitate of hydrous alumina and a platinum salt, separating said precipitate from the solvent, and subsequently reducing the platinum salt to the form of the free metal to recover an active hydroforming catalyst.

References Cited in the file of this patent

UNITED STATES PATENTS

| | | |
|---|---|---|
| 2,123,732 | Keitel et al. | July 12, 1938 |
| 2,323,868 | Hughes | July 6, 1943 |
| 2,348,647 | Reeves et al. | May 9, 1944 |
| 2,371,087 | Webb et al. | Mar. 6, 1945 |
| 2,479,109 | Haensel | Aug. 16, 1949 |
| 2,611,749 | Haensel | Sept. 23, 1952 |